(12) United States Patent
Young

(10) Patent No.: US 6,246,460 B1
(45) Date of Patent: Jun. 12, 2001

(54) ACTIVE MATRIX LIQUID CRYSTAL DISPLAY DEVICES

(75) Inventor: Nigel D. Young, Surrey (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/422,741

(22) Filed: Oct. 21, 1999

(30) Foreign Application Priority Data

Nov. 20, 1998 (GB) .................................................. 9825314

(51) Int. Cl.[7] ........................ G02F 1/1345; G02F 1/136; G02F 1/1333

(52) U.S. Cl. ......................... 349/151; 349/152; 349/42; 349/138

(58) Field of Search .................................. 349/151, 152, 349/42, 43, 138

(56) References Cited

U.S. PATENT DOCUMENTS

| | | | |
|---|---|---|---|
| 4,826,297 | * 5/1989 | Kubo et al. | 350/339 R |
| 5,095,304 | * 3/1992 | Young | 340/766 |
| 5,130,829 | 7/1992 | Shannon | 359/59 |
| 5,641,974 | 6/1997 | Den Boer et al. | 257/59 |
| 5,798,534 | * 8/1998 | Young | 257/59 |
| 5,936,698 | * 8/1999 | Koyama | 349/187 |
| 5,952,588 | * 9/1999 | Young | 73/862.626 |
| 5,982,462 | * 11/1999 | Nakano et al. | 349/43 |
| 5,982,469 | * 11/1999 | Awane et al. | 349/151 |
| 6,046,479 | * 4/2000 | Young et al. | 257/350 |
| 6,108,055 | * 8/2000 | Oima et al. | 349/38 |

FOREIGN PATENT DOCUMENTS

| | | | |
|---|---|---|---|
| 0617310A1 | 9/1994 | (EP) | G02F/1/1335 |
| 10288797 | 10/1998 | (JP) | G02F/1/136 |

OTHER PUBLICATIONS

"Fully Integrated Poly–Si TFT CMOS Drivers for Self–Scanned Light Valve" by Y. Nishihara et al. SID 92 Digest, pp. 609–612.

"A 1.8–in Poly–Si TFT–LCD for HDTV Projectors With a 5–V Fully Integrated Driver" by S. Higashi et al, SID 95 Digest, pp. 81–84.

* cited by examiner

Primary Examiner—William L. Sikes
Assistant Examiner—Tarifur R. Chowdhury
(74) Attorney, Agent, or Firm—Norman N. Spain

(57) ABSTRACT

In an active matrix liquid crystal display device of the kind having an array of pixel electrodes supported on an insulating film provided over active matrix circuitry, comprising switching devices, e.g. TFTs, and address lines, carried on a substrate with each pixel electrode being connected to the output of a respective switching device through the insulating film, and in which a row or column drive circuit is integrated on the substrate peripherally of the array, problems due to resistance in power or signal conductor lines of the drive circuit are conveniently overcome by extending the insulating film thereover and forming supplementary conductor tracks from the conductive layer constituting the pixel electrodes, each track being connected to its associated underlying conductor line through the film. Such tracks can be of greater width and thickness than the conductor lines.

6 Claims, 2 Drawing Sheets

ACTIVE MATRIX LIQUID CRYSTAL DISPLAY DEVICES

BACKGROUND OF THE INVENTION

This invention relates to an active matrix liquid crystal display device comprising on a substrate an array of switching devices, at least one set of address lines connected to the switching devices, an insulating layer extending over the substrate and covering the address lines, and an array of display pixel electrodes comprising a conductive layer carried on the insulating layer, each of the pixel electrodes being connected to a respective switching device through a contact hole formed in the insulating layer.

An example of such a display device is described in EP-A-0617310. In this device, a row and column matrix array of display pixels is provided, each of which is driven via an associated switching device in the form of a TFT (thin film transistor). As is usual, the device comprises a layer of liquid crystal material disposed between a pair of spaced substrates carrying electrodes which define individual display pixels. The TFTs are carried on the surface of a first substrate together with sets of row, (scanning), conductors and column, (data), conductors through which the TFTs are addressed for driving the display pixels. As in conventional active matrix LCDs using TFTs, each TFT is disposed adjacent the intersection between respective ones of the row and column conductors. The gates of all the TFTs associated with a row of display pixels are connected to a respective row conductor conductor and the sources of all the TFTs associated with a column of pixels are connected to a respective column conductor. Unlike conventional active matrix LCDs, however, in which the individual pixel electrodes are arranged substantially co-planar with, and laterally of, the TFTs, the reflective metal pixel electrodes in this device are carried on an insulating film which extends over the first substrate and covers the TFTs and the sets of address conductors so that the pixel electrodes are positioned generally above the level of the TFTs and the address conductors. Each individual pixel electrode is connected to the drain electrode of its associated TFT through a respective opening formed in the insulating film directly over the drain-electrode. An advantage of this type of construction, in which the array of pixel electrodes and the array of TFTs are provided at respective different levels above the substrate surface, is that the pixel electrodes can be enlarged such that at two opposing sides they extend slightly over adjacent row conductors and at their two other opposing sides they extend slightly over adjacent column conductors rather than being sized smaller than the spacing between adjacent row conductors and adjacent column conductors, and with gaps provided between each edge of the pixel electrode and the adjacent conductor, as in conventional display device arrangements. In this way, therefore, the pixel aperture is increased and in operation more light which passes through the liquid crystal layer and reaches the pixel electrode is reflected back to produce a brighter display output. Moreover, parts of a deposited metal layer which is patterned to form the reflective pixel electrodes can be left immediately overlying the TFTs during the patterning process so as to act a slight shields for the TFTs to reduce photoelectric effects in the TFTs due to light incident thereon, thereby avoiding the need to provide black matrix material on the other substrate for this purpose as is usual. This other, transparent, substrate carries a continuous transparent electrode common to all pixels in the array and, in the case of a colour display, an array of colour filter elements corresponding to the array of pixels with each filter element overlying a respective pixel electrode.

It is known also to integrate drive circuits for driving the display pixels on the same substrate as the switching devices and address lines peripherally of the display array which circuits employ switching devices and connection lines fabricated simultaneously with the switching devices, e.g. TFTs, and address lines from common deposited layers. Such integration avoids the need to provide separately fabricated drive circuits and to connect those circuits to the address lines. In the case of a TFT display device, both the row (scanning) drive circuit and the column, (data) drive circuit can readily be integrated using polysilicon technology although sometimes amorphous silicon technology can be used. Examples of LC display devices using integrated drive circuits are described in the paper entitled "Fully Integrated Poly-Si TFT CMOS Drivers for Self-Scanned Light Valve" by Y. Nishihara et al in SID 92 Digest, pages 609–612, and in the paper entitled "A 1.8-in Poly-Si TFT—LCD for HDTV Projectors with a 5-V Fully Integrated Driver" by S. Higashi et al in SID 95 Digest, pages 81 to 84.

Typically the row (scanning) drive circuit comprises a digital shift register circuit and the column, data, drive circuit comprises a multiplexing circuit. Both circuits utilise conductor lines in the form of bus lines, bus bars, or other conductors carrying for, example, predetermined voltages, such as the Vss and Vdd power supply lines, or signals, for example, clock or video signal lines, which are formed usually from a metallisation used for providing either the set of row address conductors or the set of column address conductors in the pixel array and photolithographically defined at the same time as that set of conductors from the deposited metal layer. Consequently, the thickness of these conductor lines corresponds to the thickness of the address lines and desirably this thickness is maintained as small as possible so as to avoid introducing high steps. Also, because space at the periphery of the substrate is normally at a premium to provide a compact display device, the conductor lines tend to be narrow in width. Problems are encountered, however, as a result of limitations in the electrical conductivity of these lines, and especially their inherent resistance, which can have a significant effect on applied voltages or signals along their length, bearing in mind that they can extend for at least a substantial proportion of the width or height of the display pixel array.

SUMMARY OF THE INVENTION

It is an object of the present invention to provide an active matrix LCD of the aforementioned kind and having integrated driver circuitry in which this problem is reduced at least to some extent.

According to the present invention, an active matrix LCD of the kind described in the opening paragraph, and which has a drive circuit integrated on the substrate and connected to the set of address lines that includes at least one conductor line, is characterised in that the insulating layer extends over the conductor line and the conductive layer carried on the insulating layer which provides the pixel electrodes provides also a conductor track on the insulating layer overlying the conductor line and connected therewith through at least one contact opening formed in the insulating layer. In this way, the conductive material used for the pixel electrodes is used also to form one, or more, electrical conductors at the periphery that supplements the, or each, conductor line. By virtue of the conductor track being connected through the insulating layer to the underlying line, the track and conductor line act together in parallel as a single conductor with improved, lower, resistance. Importantly, such improvement in the resulting effective electrical conductivity of the line is obtained conveniently and inexpensively, with no additional deposited materials being required since the insulating layer and upper conductive layer are already present in this type of device structure and similarly the processing steps for forming contact holes through the insulating layer are already used. The additional conductors and contact holes can thus be provided merely by appropriately modifying the patterning masks utilised.

In a reflective display device in which the pixel electrodes are formed of a reflective metal, the deposited metal layer, which when patterned provides the pixel electrodes and the one or more conductor tracks, can if desired have a thickness significantly greater than that of the deposited metal layer used for the conductor lines.

A further advantage is that the conductor track provides redundancy in the event of the underlying conductor line being defective and having a break along its length.

The, or each, conductor track is preferably connected to the underlying line through a plurality of spaced contact holes formed in the insulating layer along the length of the line. Alternatively, the contact hole could be in the form of an elongate channel in the insulating layer extending along at least a significant portion of the line.

Advantageously, the width of the conductor track can be greater than that of its underlying line, thus lessening electrical resistance even further. Although by increasing its width the track may then overlie other circuit components adjacent its associated conductor line, this should not cause any problems provided the insulating layer is sufficiently thick to provide field shielding and effectively eliminate any undesirable capacitive coupling between the conductor track and such components.

BRIEF DESCRIPTION OF THE DRAWING

An active matrix LC display device in accordance with the present invention will now be described, by way of example, with reference to the accompanying drawings, in which.

Figure 1:
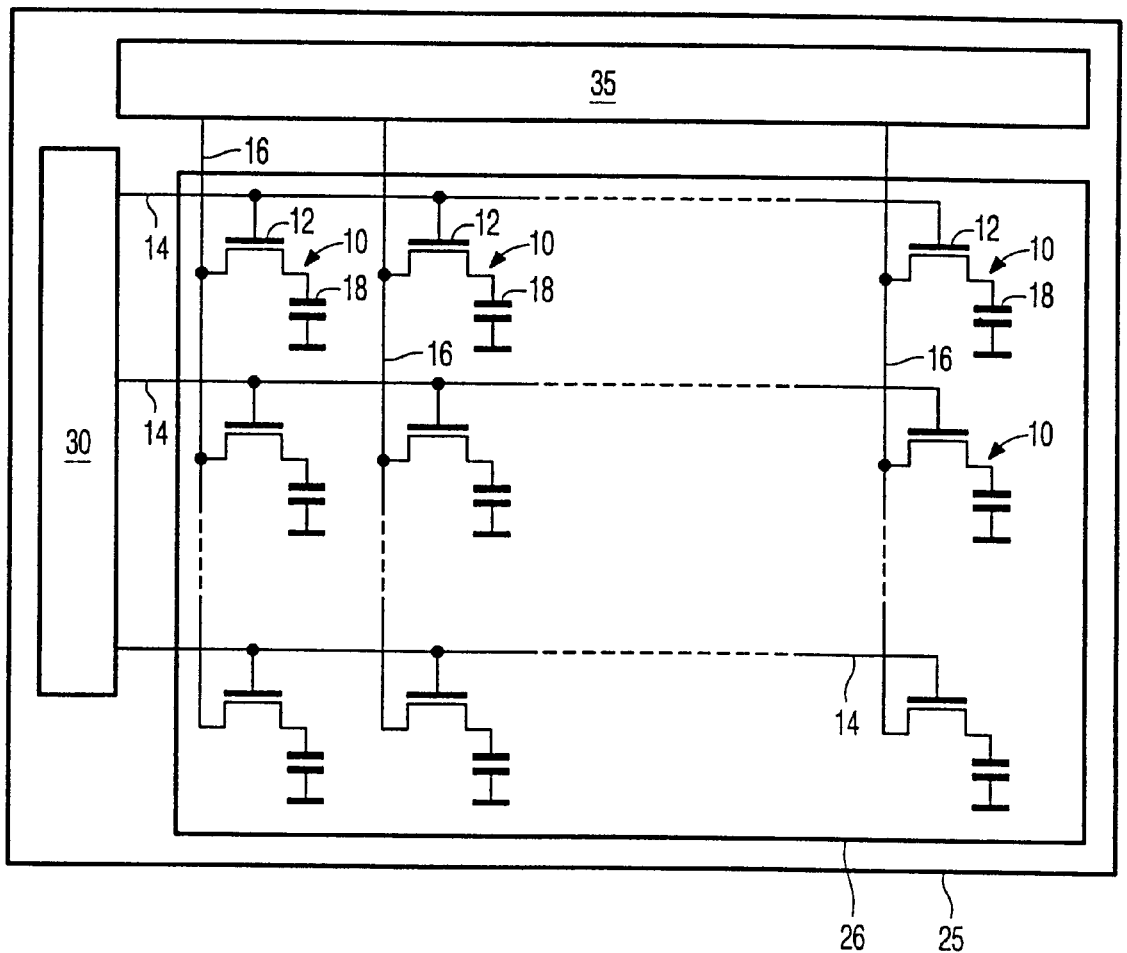
FIG. 1 is a simplified schematic circuit diagram of the active matrix LC display device showing its principal components.

It will be appreciated that the figures are merely schematic and are not drawn to scale. In particular certain dimensions such as the thickness of layers or regions may have been exaggerated whilst other dimensions may have been reduced. The same reference numerals are used throughout the figures to indicate the same or similar parts.

DETAILED DESCRIPTION OF THE INVENTION

The invention will now be described in greater detail with reference to the figures of the drawing.

Figure 2:
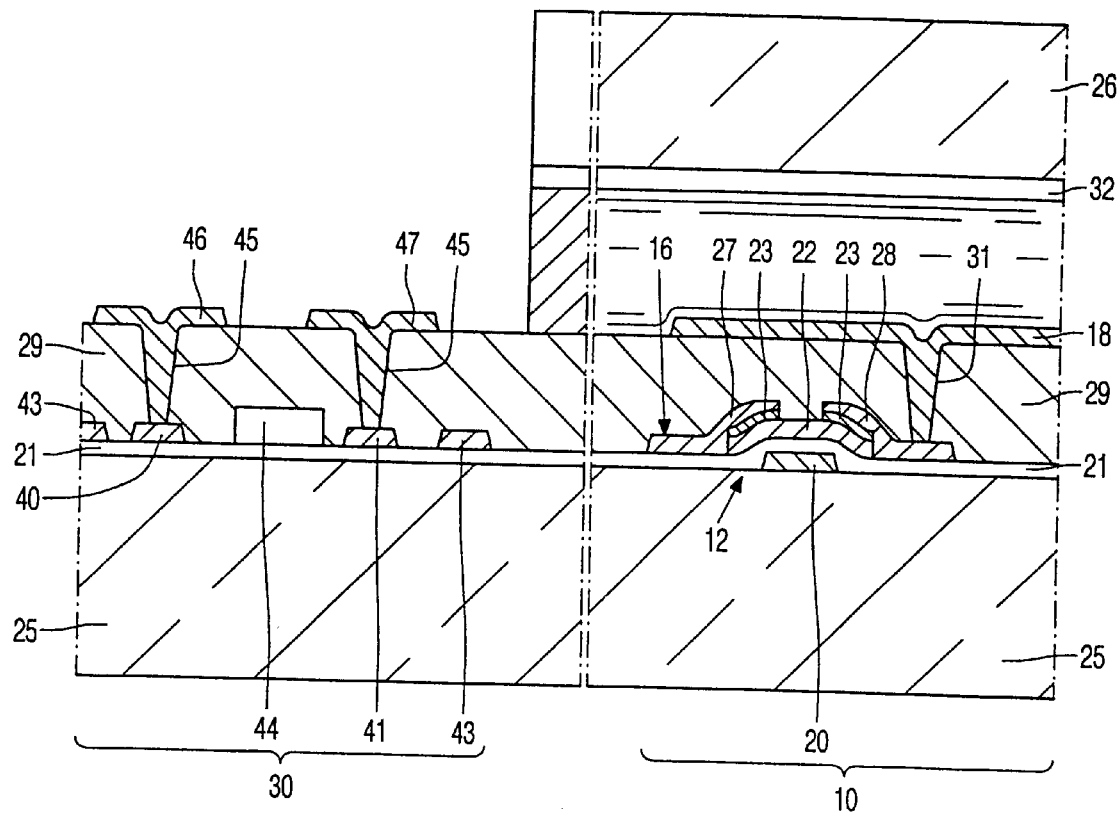
FIG. 2 is a simplified schematic cross-sectional view through a portion of the display device showing a part of its pixel array and a part of a peripheral, integrated drive circuit.

The display device of FIGS. 1 and 2 comprises a matrix array of display pixels 10, each having an associated switching device and being operable in a reflective mode, and is of the so-called field shielded pixel type. For simplicity, only a few of the display pixels, organised in rows and columns, are shown here although it will be appreciated that the device typically may comprise several hundred rows and columns of display pixels. Referring to these figures, the device comprises a pair of insulating substrates 25 and 26 which are spaced apart and sealed together around the periphery of the pixel array so as to contain a layer 24 of liquid crystal material therebetween. Both substrates are of glass, although only one of the substrates needs to be optically transparent to transmit light in operation. The substrate 26 carries on its inner surface adjacent to the liquid crystal layer a transparent electrically conducting layer 32, for example of ITO, which extends continuously over the display area, corresponding to the area of the pixel array, and serves as a common electrode for the display pixels in the array. Over this common electrode an LC orientating film (not shown) is provided in conventional manner.

The other substrate 25 carries on its inner surface active matrix addressing circuitry and the reflective pixel electrodes which define respective individual display pixels. In this embodiment, TFTs 12 are used as the switching devices associated with the display pixels in the active matrix addressing circuitry. The general operation of this circuitry and the manner in which the display pixels are driven follows conventional practice, as is described for example in U.S. Pat. No. 5,130,829 the contents of which are hereby for incorporated by reference. Briefly, the rows of pixels in the array are addressed in sequence one at a time in respective row address periods by means of a scanning (gating) signal applied to each row in turn which turns on the TFTs associated with the pixels of the row allowing each pixel in the selected row to be loaded with its respective data signal that determines its display output. Following addressing of all the rows of pixels in this manner in one field period, the rows are addressed again in a similar manner in successive fields.

The pixels are connected to sets of row (scanning) and column (data) address lines 14 and 16 in the form of electrical conductors carried on the substrate 25 with the gates of all the TFTs 12 in a row of pixels being connected to a respective row conductor 14 and the source electrodes of all the TFTs in a column being connected to a respective column conductor 16. The drain of each TFT is connected to a pixel electrode 18 of its associated display pixel. The TFTs 12 are of known type, for example polysilicon or amorphous silicon TFTs with top or bottom gate structures.

In operation, scanning signals are applied to each row address conductor 14 in turn by a row drive circuit 30, comprising for example a digital shift register, and data signals are applied to the column conductors 16 in synchronisation with the scanning signals by a column drive circuit 35. In response to a row conductor being supplied with a gating signal, the TFTs 12 connected to that row conductor are turned on causing the respective display pixels to be charged according to the level of the data signal then existing on their associated column conductors. Upon termination of a gating signal at the end of a respective row address period, corresponding for example to the line period of an applied video signal, the TFTs of a row switch to their off, high impedance, state and a gating signal is applied to the next row conductor in order to address the next row of display pixels. The display pixel electrodes 18 are formed of light reflecting conductive material such as a metal and light entering the front of the device through the substrate 26 carrying the common electrode is modulated by the LC material at each display pixel according to the respective applied data signal voltage and, depending on their display state, reflected by the reflective pixel electrodes back through that substrate, to generate a display image built up by addressing all the pixels in the array which is visible to a viewer at the front of the device.

The row and column drive circuits 30 and 35 are for convenience and simplicity integrated on the substrate 25 and fabricated simultaneously with the active matrix circuitry comprising the TFTs 12 and the row and column address conductors 14, 16 using the same thin film processing technology rather than being fabricated as separate components and requiring the provision of electrical interconnection means to connect their outputs with the row and column address conductors. Integrated drive circuits are well known, examples of such being described in the aforementioned papers. Normally polysilicon technology is used, although amorphous silicon technology can be employed instead. With regard to the integrated column drive circuit 35 it is most usual in view of limitations in the performance of the TFTs utilised compared with that of transistors in single crystal IC form to provide this in the form of a simple multiplexing type of circuit operated by a shift register.

FIG. 2 shows schematically and in simplified manner a cross-section through a part of the active matrix substrate of the display device comprising a typical pixel and a part of the peripheral, integrated, row drive circuit 30. The active matrix circuitry and the drive circuit 35 are formed using conventional thin film processing techniques involving the deposition and photolithographic patterning of various insulating, conductive and semiconductive layers deposited on the substrate 25, e.g. by a CVD process. The general structure of the pixel array part shares similarities with, for example, the structures described in EP-A-0 617 310 and U.S. Pat. No. 5,641,974 to which reference is also invited. In these structures, the TFTs and sets of address conductors are carried on the substrate and the set of pixel electrodes is provided on an insulating film extending over this circuitry so as to be positioned at a higher level above, and spaced from, the TFTs and address conductors. One advantage of this arrangement is that the pixel electrodes can be extended to overlap adjacent row and column conductors so as to increase the effective pixel aperture.

In the particular embodiment shown in FIG. 2, bottom gate a-Si TFTs are used. In this example structure, the gate 20 of the TFT 12 at each pixel is provided in the form of an integral extension of its associated row conductor 14 (not visible in FIG. 2). The set of row conductors together with the integral gates are provided by depositing and patterning a layer of conductive material such as aluminum or aluminum and chromium. Following this an insulating layer 21 of silicon nitride or oxide constituting the gate insulator of the TFTs, and serving also to separate the row and column conductors at their cross-over points, is deposited over the entire surface of the substrate 25. Thereafter, a layer 22 of the amorphous silicon is deposited and patterned to leave portions extending over the gates 20 at the locations of the TFTs constituting the channel regions of the TFTs. Doped (n type) amorphous silicon source and drain contact electrodes 23 may then be formed over the intrinsic amorphous silicon layer 27 at opposite sides of the gate if desired. The set column conductors 16 and the TFT source and drain electrodes are then defined by depositing over the substrate a layer of, for example, a metal, such as Al, or a metal alloy and patterning this layer to leave the set of column conductors 16, each of which is defined with integral extensions 27 forming the source electrodes of its associated TFTs, and the drain electrodes 28. The drain electrode layer 28 of each of the TFTs extends laterally of the TFT over the substrate surface and above the insulator layer 21 to provide a pixel electrode contact area. Although a particular, and simple, form of TFT structure is shown here, it will, of course, be appreciated that other kinds of TFT structures which are known in the art, for example of polysilicon or amorphous silicon type and with either a top or bottom gate, can be used instead and that the nature and order of the layers, and the materials employed, can be varied accordingly.

Over this structure on the substrate 25 a comparatively thick film 29 of insulating material such as silicon nitride or oxide, or an organic insulating material such as a polyimide or a photo-resist, is disposed. The film 29 extends continuously over the structure to completely cover the TFTs 12 and the sets of row and column conductors and provides a surface parallel to the substrate surface and spaced from those components upon which the pixel reflective electrodes 18 are formed. Prior to forming these electrodes, however a set of tapering contact holes, or vias, 31 are provided by a photolithographic process, one at each pixel, which extend through this insulating layer 29 over respective drain electrode layers 28. When using silicon nitride or oxide or a polyimide material, a standard photolithographic process involving resist, exposure through a mask, and etching may be employed to form the contact holes. When using a photo-resist polymer, the contact holes can be formed simply by photo developing.

The pixel electrodes 18 are then formed by depositing a layer of electrically conductive, light—reflective, metal material such as aluminum, an aluminum alloy, or silver on the substrate which covers the surface of the insulating interlayer 29 and the sloping sidewalls of the tapering contact openings 31 to contact electrically with the underlying drain electrode at each contact opening location. This reflective metal layer is then photolithographically patterned to leave the array of discrete, mutually-spaced, pixel electrodes 18, each of which is electrically connected with its respective underlying TFT drain electrode 28 via the contact opening. Each pixel electrode 18 in this embodiment is generally rectangular, for example, approximately 100 $\mu$m square, and in order to provide a high aperture ratio extends completely over the area between the sections of the two adjacent row conductors 14 and the two adjacent column conductors 16 bordering the pixel 10 and partly over these conductor sections as well. Each pixel electrode 18 is separated from adjacent pixel electrodes, which also overlap these conductors, by small gaps so as to maintain electrical isolation between the respective electrodes. The comparatively thick insulating interlayer 29 ensures that there are no significant capacitive coupling effects between a pixel electrode 18 and the address conductors at the regions of overlap. The electrodes 18 are covered by a further LC orientation layer.

FIG. 2 also shows, highly simplified, a part of the integrated row drive circuit for supplying scanning signals to the set of row conductors. Such row drive circuits and the manner of their operation are well known and it is not thought necessary to describe here in detail their particular circuitry and operation. Conventionally, they include bus lines, bus bars or other conductor lines carrying predetermined voltages or signals, for example Vss and Vdd (source and drain) power supply lines or clock signal lines, which extend along the periphery of the array over a distance corresponding at least to a substantial part of the distance between the first and last row conductors. In the simple example illustrated in FIG. 2, two such conductor lines 40 and 41, are shown in cross-section which may be, for example, the Vss and Vdd power supply bus lines carrying predetermined voltages constituting respectively the gate signal voltage for turning on the rows of TFTs and a hold signal voltage level which holds the TFTs in their off state in the interval between scanning signals. These voltages are supplied to the individual row conductors by switching circuitry, comprising TFTs, connected between the bus lines and the row conductors, and operated by a shift register circuit, here shown schematically in simple block form at 44. Other conductive interconnections present in the circuitry are indicated for example at 43.

As previously mentioned, the row drive circuit is fabricated simultaneously with the active matrix array on the substrate 25 using common deposited layers. In the example structure of FIG. 2, the insulating layer 21 extends continuously over the substrate surface beyond the area of the pixel array to cover the peripheral region where the drive circuit is provided as well. However, the insulating layer may be removed from these regions if desired. The TFTs, conductor lines and other electrical interconnections of the row drive circuit are fabricated simultaneously with the TFTs 12 and address conductors 14 and 16. More particularly, the bus lines 40 and 41, and likewise the interconnections 43, are formed from the same deposited metal layer used to provide the column conductors 16 and source and drain electrodes 27 and 28 of the TFTs 12, as well as the source and drain electrodes of the TFTs of the row drive circuit, by appropriate photolithographic patterning of this layer. Alternatively, the bus lines 40 and 41 could be formed, together with the gates of the TFTs of the row drive circuit, from the same deposited metal layer used for the gates 20 and row conductors 14 and in this case the insulating layer 21 would extend over rather than beneath the bus lines. In general, the particular deposited metal layer selected to provide the bus lines is dependent to an extent on the TFT structure employed. With top gate TFTs, the metal layer used for the gates may be used therefore to provide these lines. Typically, the thickness of the metal layer used for the column conductors 16, the source and drain electrodes, and the bus lines 40 and 41 may be around 1 $\mu$m and the width of these bus lines may be up to around 10 $\mu$m.

The insulating film 29 is deposited following fabrication of the active matrix circuitry and the circuitry of the row drive circuit so as to extend over this peripheral portion of the substrate to cover the row drive circuitry as well. When forming the contact openings 31 in the film 39 over the pixel TFT drain electrodes, contact openings 45 are formed at the same time by the same process at spaced locations along the length of the bus lines 40 and 41. The metal layer then subsequently deposited over the film 39 and through its openings 31 to form the pixel electrodes 18 similarly extends through these contact openings 45 to contact the bus lines 40 and 41 at the bottom of the openings. If the structure is such that the insulating layer 21 extends over these bus lines, it will be appreciated that the contact openings 45 are formed through both the insulating layers 29 and 21.

Simultaneously with patterning this deposited metal layer to define the pixel electrodes 18, the region of this layer overlying the row drive circuit is also patterned in the same operation to leave conductor tracks in the form of strips or lines of the metal 46 and 47 extending above and along the bus lines 40 and 41 respectively, each of which in electrical contact with its associated bus line at spaced locations along the length of the bus line via the contact holes 45. The conductor 46 and bus line 40, and similarly the conductor 47 and bus line 41, are thus both electrically and physically in parallel with one another.

Each of the bus lines 40 and 41 therefore has an associated, supplementary, conductor connected thereto and extending over the insulating interlayer 29 to provide a parallel conductive path and improve the effective electrical conductivity. The conductor track 46 or 47 together with its associated bus line 40 or 41, act as a single conductor and by virtue of being electrically in parallel overcome problems caused by electrical resistance in the bus line, due especially to restrictions on the width and thickness of these lines imposed by limitations in available space and the fabrication processes employed. Because they are formed from the same deposited metal layer as the pixel electrodes they can be significantly thicker than the bus lines, for example around 1 $\mu$m. Moreover, as shown in FIG. 2, the width of these tracks can be greater than that of their underlying bus line, for example up to around 100 $\mu$m. Although they may consequently overlap other circuit components of the row drive circuit, the field shielding property of the relatively thick layer 29 ensures that unwanted capacitive couplings are avoided. The conductor tracks preferably extend along at least a substantially part of the length of the bus lines but even if they extend only part way along the length of the bus line some improvement can still be obtained.

Each conductor track 46 or 47 is connected with its associated bus line, 40 or 41 respectively, at least via a contact opening 45 at each end of the conductor track but preferably additional interconnections are formed doing its length by providing further contact openings 45 at spaced intervals. Alternatively, a single contact opening extending in the form of elongate channel along the intended length of the conductor track 40 or 41 may be provided in the insulating layer 29 so that, after defining the deposited metal layer the conductor track is in continuous electrical contact with the underlying bus line along its complete length.

It will be appreciated that reinforcing the conductor lines with supplementary conductors to avoid problems due to resistance of the lines in the above-described manner, entailing merely the use of existing deposited layers and minor modification to the patterning operation, is both simple and convenient to implement.

Supplementary conductor tracks can be provided also in the column drive circuit 35. As mentioned, the general operation of integrated column drive circuits is typically based on a multiplexing technique in which analogue video information is sequentially transferred from one or more video input lines to corresponding groups of one or more of the columns address conductors in the display device. The video information is transferred via multiplexing switches, which may consist of NMOS or PMOS TFTs or CMOS transmission gates. By means of a shift register circuit, acting as a control circuit supplying control signals to the multiplexer switches, the switches are operated in groups and when a group of switches is turned on the corresponding columns are charged to the voltage levels of the video lines. When the switches turn off the voltages on the column conductors are maintained by the capacitance of the column conductors, and any additional storage capacitors which may be connected to them. During a video line period each group of multiplexing switches is turned on in sequence until all of the columns of display elements have been charged with the appropriate video information. Like the row driver circuit, such circuit similarly comprises power supply lines, e.g. Vss and Vdd lines, clock signal lines, and the like, in addition to the video lines. These lines consist of conductors extending across the substrate 25 parallel to the row conductors 14 and may be of a similar length. Like the bus lines 40 and 41 they are usually formed from the deposited metal layer used for the row or column address conductors. By extending the insulating layer 29 so as to cover at least some of these lines in the peripheral column drive circuit, opening up further contact holes in this layer overlying the lines simultaneously with forming the contact holes 31, depositing the upper metal layer and then patterning this layer to leave conductor tracks extending parallel with respective lines at the same time as defining the pixel electrodes, supplementary conductors connected to their respective underlying lines via the contact holes are provided to alleviate problems due to the resistance of these signal and power lines.

Although the embodiment of display device described comprises a reflective type device using metal pixel electrodes and row and column conductors, the invention may be applied to some advantage in a transmission type LC display device in which the pixel electrodes are formed of a transparent conductive material such as ITO. In this case the supplementary conductive tracks formed above the bus lines would be formed from this material.

Rather than the two substrates being sealed together immediately around the display pixel array area, the seal may instead be arranged to extend around the drive circuits as well such that these lie inside the region filled with LC material.

While the embodiment of display device described comprises a TFT LC display device, the invention could be applied also to an active matrix LC display device of the kind in which the switching devices comprise two terminal non-linear devices such as thin film diodes or MIMs. In this case, only one set of address conductors, for example the row conductors is carried on the substrate 25 together with the switching devices and pixel electrodes, the other set of address conductors being provided on the other substrate, 26, in known manner. The integrated drive circuits may then be of a kind comprising thin film diodes rather than TFTs, with the row drive circuit and the column drive circuit being integrated on the substrates 25 and 26 respectively. In this case the conductor lines in the row drive circuit can be supplemented by conductor tracks in the above-described manner.

From reading the present disclosure, other modifications will be apparent to persons skilled in the art. Such modifications may involve other features which are already known in the field of active matrix LC display devices and component parts thereof and which may be used instead of or in addition to features already described herein.

What is claimed is:

1. An active matrix liquid crystal display device comprising, on a substrate, an array of switching devices, at least one set of address lines connected to the switching devices, an insulating layer extending over the substrate and covering the address lines, an array of display pixel electrodes comprising parts of a common conductive layer carried on the insulating layer, and a layer of liquid crystal material overlying the array of pixel electrodes, each of the pixel electrodes being connected to a respective switching device through a contact hole formed on the insulating layer, wherein the display device further includes a drive circuit integrated on the substrate and connected to the set of address lines, said drive circuit including at least one conductor line that extends along a substantial part of one side of the array of pixel electrodes, wherein the insulating layer extends over said at least one conductor line, wherein the common conductive layer that is carried on the insulating layer and, parts of which comprises the pixel electrodes, also comprises a conductor track on the insulating layer which conductor track extends parallel to, and overlies said at least one conductor line, and wherein the conductor track is connected to said at least one conductor line through a plurality of contact openings formed on the insulating layer at spaced locations along the length of said at least one conductor line.

2. An active matrix liquid crystal display device according to claim 1, characterised in that the conductor track has a width greater than that of the conductor line.

3. An active matrix liquid crystal display device according to claim 1, characterised in that the conductive layer constituting the pixel electrodes and the conductor track comprises a metal.

4. An active matrix liquid crystal display device according to claim 1, characterised in that the set of address lines and the at least one conductor line of the drive circuit compromise a common conductive layer.

5. An active matrix liquid crystal display device according to claim 1, characterised in that the drive circuit comprises a row drive circuit for supply scanning signals to the set of address lines.

6. An active matrix liquid crystal display device according to claim 1, characterised in that the drive circuit comprises a column drive circuit for supplying data signals to the set of address lines.

* * * * *